US007980487B2

(12) United States Patent
Mirazita et al.

(10) Patent No.: US 7,980,487 B2
(45) Date of Patent: Jul. 19, 2011

(54) TEXTURE SPRAYER

(75) Inventors: Frank G. Mirazita, Sussex, NJ (US); Joseph W. Kieffer, Chanhassan, MN (US)

(73) Assignee: Titan Tool, Inc., Oakland, NJ (US)

( * ) Notice: Subject to any disclaimer, the term of this patent is extended or adjusted under 35 U.S.C. 154(b) by 230 days.

(21) Appl. No.: 12/304,317

(22) PCT Filed: Jun. 11, 2007

(86) PCT No.: PCT/US2007/070894

§ 371 (c)(1), (2), (4) Date: Dec. 11, 2008

(87) PCT Pub. No.: WO2007/146884

PCT Pub. Date: Dec. 21, 2007

(65) Prior Publication Data

US 2009/0320751 A1 Dec. 31, 2009

Related U.S. Application Data

(60) Provisional application No. 60/804,519, filed on Jun. 12, 2006.

(51) Int. Cl.
*A01G 25/09* (2006.01)

(52) U.S. Cl. .......................................................... 239/146

(58) Field of Classification Search .................. 239/146, 239/149, 159, 166, 169, 302, 333, 377, 569–572, 239/DIG. 14; 222/95, 105, 608–610

See application file for complete search history.

(56) References Cited

U.S. PATENT DOCUMENTS

| | | | |
|---|---|---|---|
| 2,446,571 | A | 8/1948 | Browne |
| 3,797,743 | A | 3/1974 | Kommers et al. |
| 3,837,539 | A | 9/1974 | Schlegel |
| 4,465,102 | A | 8/1984 | Rupp |
| 4,501,533 | A | 2/1985 | Bower, Jr. |
| 4,865,255 | A | 9/1989 | Luvisotto |
| 5,538,402 | A | 7/1996 | McKenney |

(Continued)

FOREIGN PATENT DOCUMENTS

EP 1059122 12/2000

(Continued)

OTHER PUBLICATIONS

International Search Report for PCT/US2007/070894, dated Oct. 29, 2007. pp. 1-7.

(Continued)

*Primary Examiner* — Davis Hwu

(74) *Attorney, Agent, or Firm* — Faegre & Benson LLP

(57) ABSTRACT

A texture spray pump unit (100) having a tank (140) with an outlet for providing texture material to a pump (120), for delivery to a texture spray gun. The spray pump unit (100) also has an air source (180) for providing power to the pump (120) and air to deliver the texture material from the gun. A frame supports the tank (140), air source (180) and pump (120). The tank (140) is removable from the frame, and has a self closing valve to block leakage from the tank (140) when removed from the frame. The valve may have a pair of helper springs urging the valve closed. Mating portions on the frame and tank (140) guide engagement of a tank outlet with a pump inlet tube.

11 Claims, 19 Drawing Sheets

U.S. PATENT DOCUMENTS

| | | | | |
|---|---|---|---|---|
| 5,620,032 | A * | 4/1997 | Dame | 141/311 A |
| 6,070,808 | A | 6/2000 | Kildow | |
| 6,220,526 | B1 * | 4/2001 | Johnson | 239/323 |
| 2002/0093876 | A1 | 7/2002 | Dillinger et al. | |
| 2005/0133625 | A1 | 6/2005 | McLeod | |
| 2005/0230497 | A1 | 10/2005 | Gunderson et al. | |
| 2005/0254879 | A1 | 11/2005 | Gunderson et al. | |

FOREIGN PATENT DOCUMENTS

| | | |
|---|---|---|
| FR | 2770833 | 5/1999 |

OTHER PUBLICATIONS

Graco Brochures TexSpray GTX 2000EX dated 2008. pp. 1-2.
Graco Brochure on TexSpray Texture Sprayers; dated 2008, pp. 1-46.
Graco Interior Texture Sprayers RTX 900 and RTX 1250 Repair Manuals dated 2006 pp. 1-34.
Graco Heavy Duty Applications: A Full Line of Spray Packages for Large Projects and Heavy Coatings Manual, dated 2004 pp. 1-10.
Graco Instructions Part List GM 1030 TexSpray Manual dated Oct. 2001; pp. 1-36.
Graco RTX 1500 Electric Texture Sprayer Repair and Parts Manual Dated May 2006; pp. 1-36.
Graco TexSpray EXT HP and Twin Tank Instructions and Parts List Manual revised Apr. 2002; pp. 1-28.
Graco Instructions Parts List Manual for Texspray System Model E110C dated May 1994, pp. 1-45.
Graco Tex-Spray Compact Model 231-324, Series B Instructions-Parts List Manual dated 1995, pp. 6.
Graco TexSpray GTX 2000 Repair-Parts Manual dated May 2006, pp. 1-28.
Graco TexSpray GTX 2000 Operation Manual, dated Jul. 2005, pp. 1-22.
Graco Magnum Interior Texutre Sprayers TexFinish Repair Manual, dated 2003, pp. 19-25.
Texture Sprayers and Accessories Brochure www.all-wall.com/acatalog/A200__Portable__Sprayers__9.php accessed online May 23, 2006. pp. 1-4.
Kodiak M2 by AST (Electric Unit) Brochure www.all-wall.com/acatalog/AST__Kodiak__M@.php accessed online May 23, 2006; pp. 1-2.
Benron Equipment & Supply Texture Sprayers Brochure accessed online at http://benron.com/Texture/ef1190.html accessed online May 23, 2006. pp. 1-7.
Graco TexSpray Compact HP Instructions-Parts List Manual Rev G copyright 1997; pp. 19-27.

* cited by examiner

TEXTURE SPRAYER

CROSS-REFERENCE TO RELATED APPLICATION

This application claims the benefit of U.S. Provisional Application 60/804,519, filed Jun. 12, 2006, the entire contents of which are hereby expressly incorporated by reference.

BACKGROUND OF THE INVENTION

The present invention relates to a texture sprayer pump unit or system as described below. It is adapted to deliver a semi-solid texture material in the form of a slurry from an onboard tank to a hand-held texture spray gun for application to a building surface, such as a wall or ceiling.

SUMMARY OF THE INVENTION

The present invention includes a texture spray pump assembly having a frame carrying a texture material pump, and a texture material tank located and supported by the frame and manually separable from the frame, the tank including a tank outlet connected to the texture material pump when the tank is received on the frame, wherein the tank has a valve that closes when the tank is separated from the frame. The valve may be a duckbill type valve.

The valve apparatus may also include at least one, and preferably a pair of helper springs urging the slit aperture closed. Each helper spring may include a crossbar located adjacent the slit aperture.

In another aspect, the present invention may be seen to include a texture spray pump assembly having a frame carrying a texture material pump, and a texture material tank having at least one relatively longer side and at least one relatively shorter side, the tank located and supported by the frame; wherein the frame may be oriented to a first position wherein the tank is positioned in an upright condition with the at least one relatively longer side oriented generally horizontally for holding texture material during spraying operation and further wherein the frame may be oriented to a second position wherein the tank is positioned to a second position for storage with the at least one relatively longer side oriented generally vertically. In this aspect, the texture spray pump assembly may further include a secondary handle attached to the frame and supporting the assembly on a generally flat surface with the frame in the second position.

DETAILED DESCRIPTION

Figure 1:
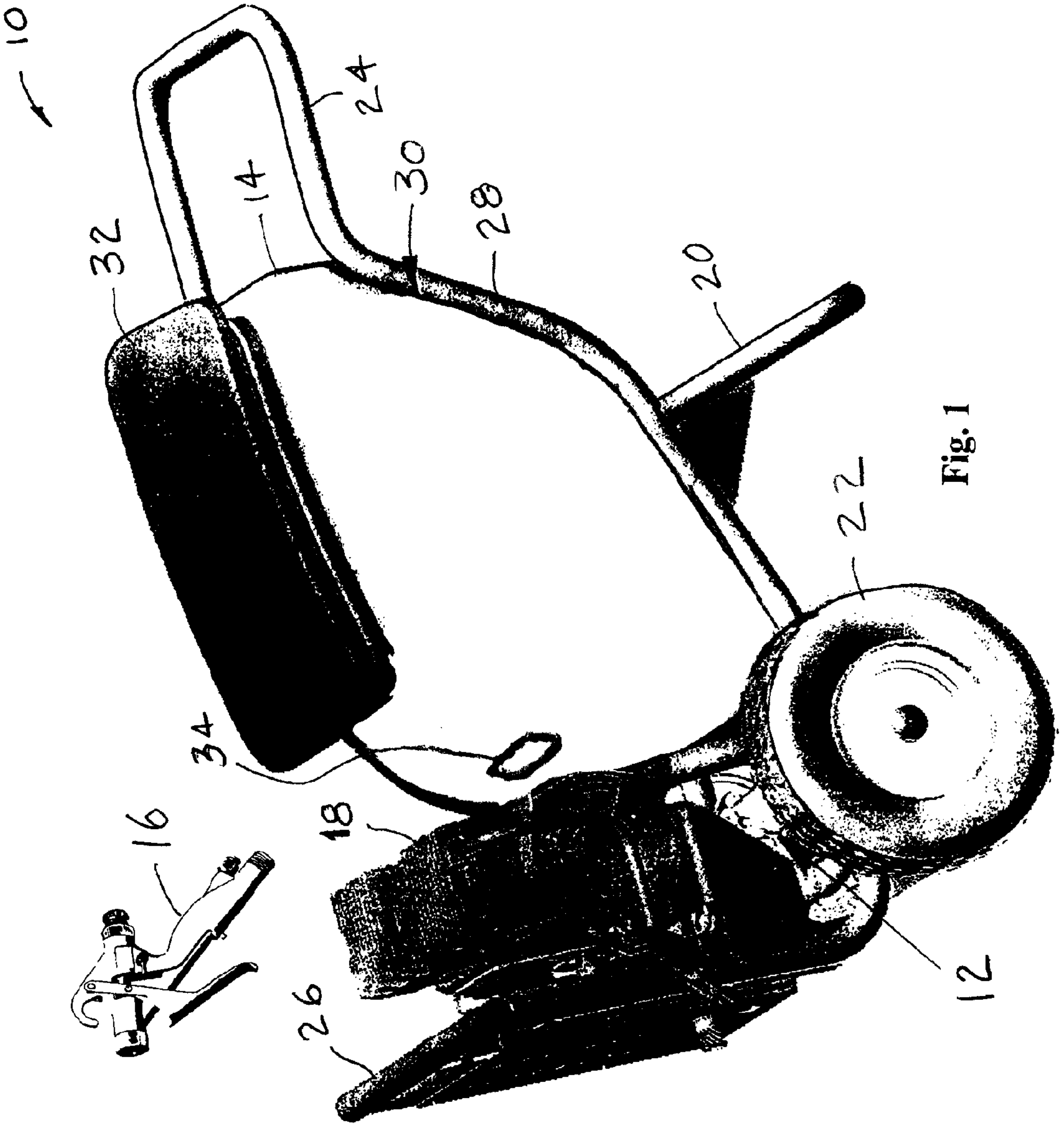
FIG. 1 shows a first perspective view from above and slightly forward of the side of the texture sprayer pump unit or system of the present invention, along with a texture spray gun.
Figure 2:
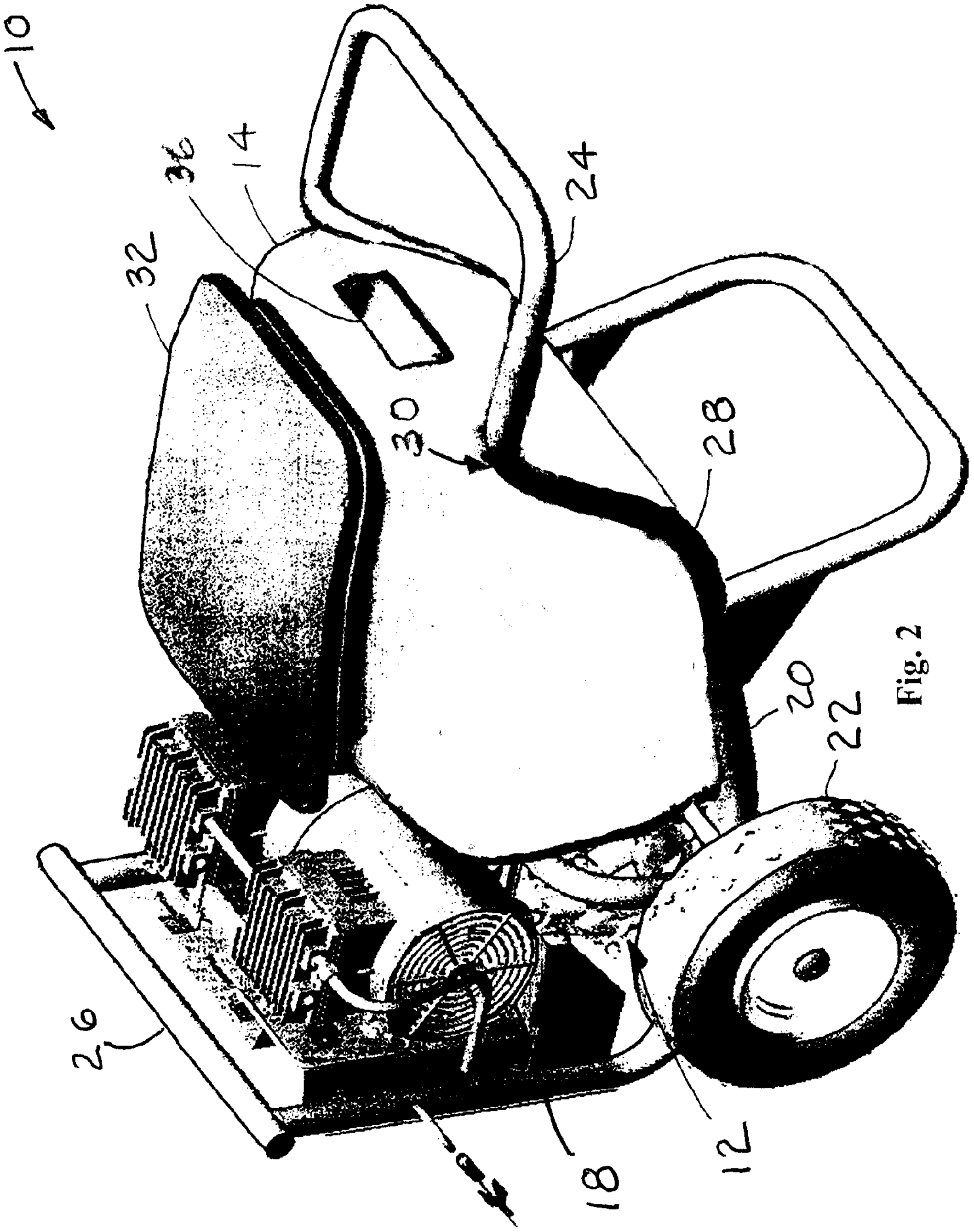
FIG. 2 shows a second perspective view from above and somewhat to the rear of the side of the texture sprayer pump unit of FIG. 1.
Figure 3:
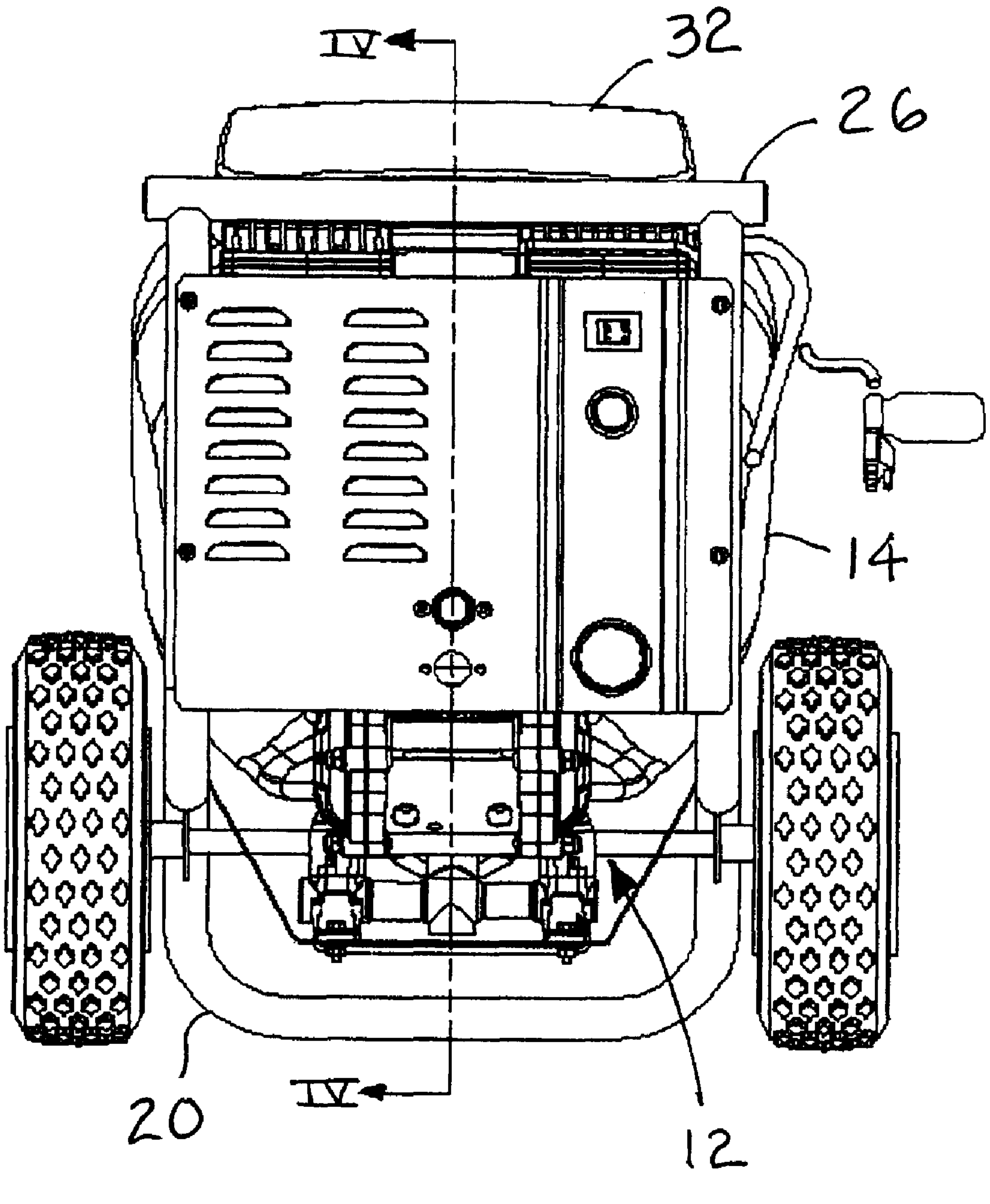
FIG. 3 shows a front elevation view of the texture sprayer of FIGS. 1 and 2.
Figure 4:
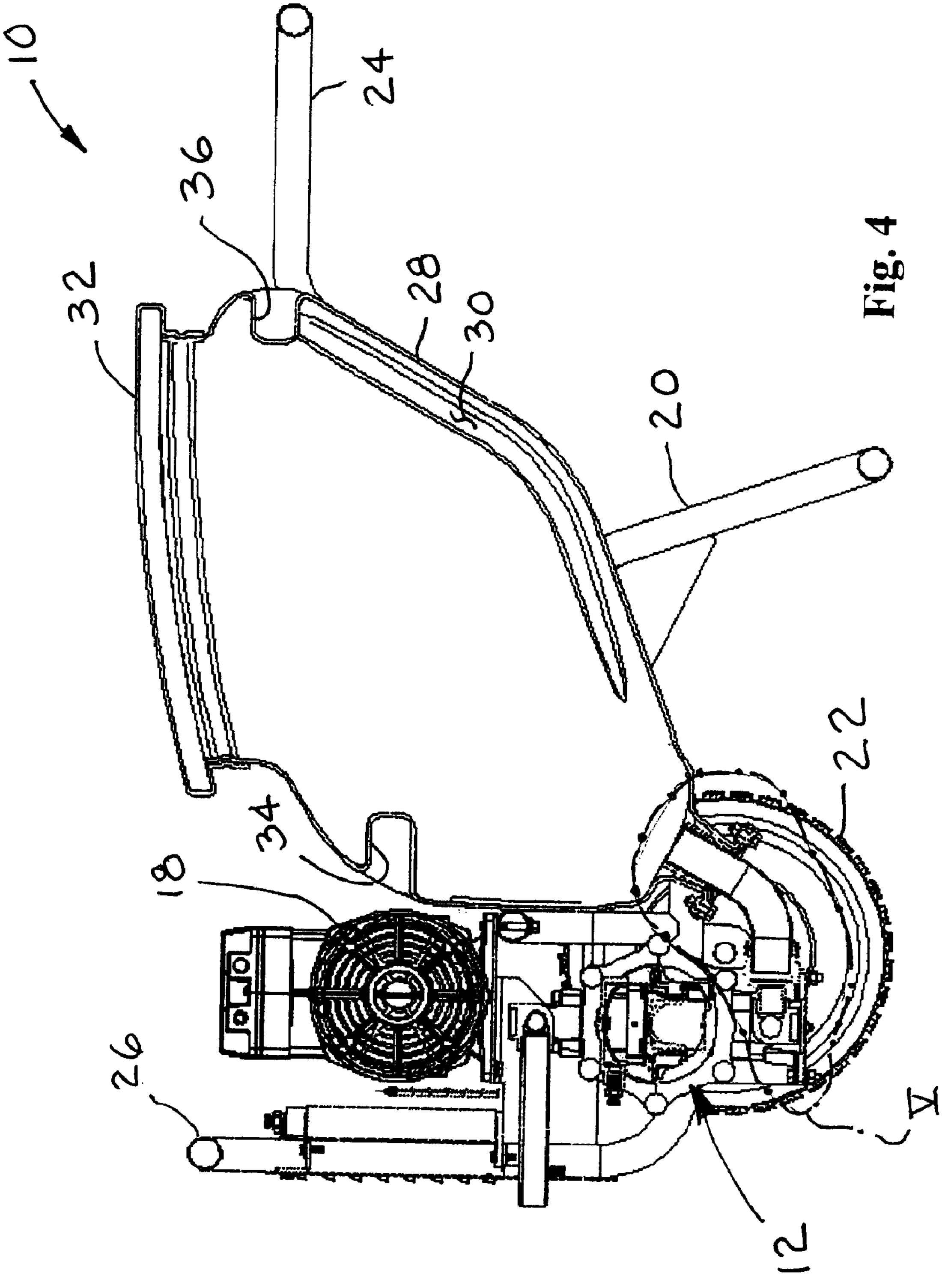
FIG. 4 shows a side elevation section view taken along line IV-IV of FIG. 3.

The present invention is a texture spray pump unit or system 10 which may be seen in FIGS. 1-4. Unit 10 preferably includes three main components: i) a pump 12 (which may be a double diaphragm transfer type pump) moving semi-solid texture material in the form of a slurry from ii) a tank 14 to a texture spray gun 16, and iii) an air source 18 (which may be a compressor) providing air to run the pump 12 and also provides air to the texture spray gun 16 to atomize the texture material as it exits a fluid nozzle 18 of the gun 16, and the tank 14 (which may be a rotational molded tank) to store the semi-solid texture material, the unit being held together and supported by a low profile, tubular frame 20 having a pair of wheels 22 and a primary handle 24. In a first embodiment, tank 14 may have a 20 gallon capacity. In a second embodiment, tank 14 may have a 10 gallon capacity. In the first embodiment, the tubular material of the frame 20 may have a 1.25 inch diameter, and in the second embodiment, the tubular material may have a 1 inch diameter. The first and second embodiments may provide 3 GPM and 1 GPM output of texture material, respectively. The frame 20 functions as the device to hold the components in place as well as the means for moving the system 10 from location to location. For ease of maneuverability, the pump 12, compressor 18 and tank 14 are arranged in a low-profile manner on the frame 20 and may be moved in a manner similar to that of a wheel barrow, unlike many prior art units which are arranged in an upright or high profile, movable in a manner similar to a hand truck. The frame 20 may also include a secondary handle 26 which functions as a guard for the transfer pump 12 and compressor 18 and may also be used as a lifting handle. The frame 20 is also designed in such a way as to have mating portions 28 which receive and guide the tank 14 (which has corresponding mating portions 30) into position on the frame 20 to result in alignment with the transfer pump 12. More particularly, mating portions 28 and 30 align a tank outlet 40 with a pump inlet tube 44, as may be seen most clearly in FIGS. 4-6.

The transfer pump 12 and tank 14 are located within the frame 20, adjacent to each other and with the pump 12 below the tank 14 so as to allow gravity to feed the transfer pump 12 with the semi-solid texture material held in the tank 14. Included with the tank 14 is a cover or lid 32 which closes the material opening at the top of the tank and functions to keep the texture material free of foreign matter as well as extending the working time of the texture material before it "skins" or begins to "dry out" by slowing down the evaporation of water from the texture material, keeping it moist longer than would be the case without a cover. The tank 14 may also include "molded-in" handles 34 and 36 for lifting the tank 14 out of the frame 20.

Figure 5:
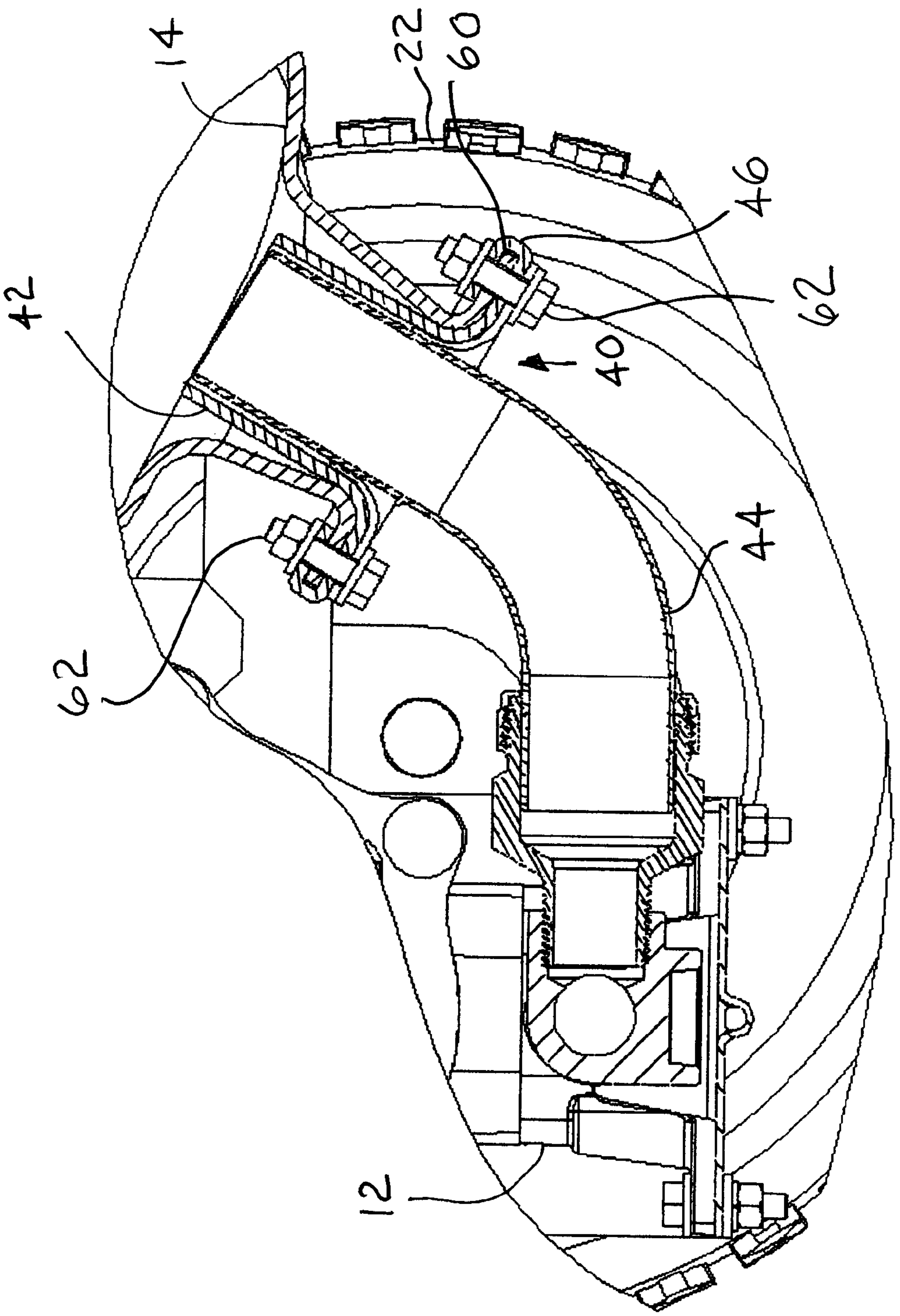
FIG. 5 is an enlarged view of a detail V of FIG. 4.

The tank outlet 40 includes a valve 42 which automatically closes the tank outlet 40 when the tank 14 is removed from the frame 20 and disengaged from the transfer pump inlet tube 44 to prevent the semi-solid texture material from flowing out of the tank 14 in the event that the tank is removed from the remainder of the unit 10 while still containing texture material. The valve 42 is preferably a duck bill type self closing valve, shown in FIGS. 7-10 in a closed condition. FIG. 5 shows the valve 42 in an open condition. In operation, when the tank 14 is placed on the frame 20, the inlet tube 44 is received in the valve 42, and causes the valve 42 to open, as shown in FIG. 5. If and when the tank 14 is removed from the frame 20, for example, by lifting tank 14 using the handles 34 and 36, the tube 44 is withdrawn from valve 42, allowing the valve 42 to close.

It is to be understood that, as the tank 14 is received on frame 20, mating portions 28 on the frame 20 align tank 14 by nesting with mating portions 30 on the tank 14 to position tank outlet 40 in alignment with the inlet tube 44, thus providing positive engagement of the valve 42 with the inlet tube 44. It may thus be seen that the tank 14 can be installed in and removed from the frame 20 (with coupling and decoupling between the tank outlet 40 and pump inlet tube 44) without the use of tools.

Referring most particularly to FIGS. 5, and 7-10, one embodiment of the valve 42 may be seen to be a duckbill type valve with a peripheral flange portion 46, formed with a lip 48 forming a circumferential recess 50. Valve 42 also has a central portion 52 formed as a cylinder with slit 54 between a pair of angled faces 56, 58. Valve 42 is preferably installed by receiving a flange 60 of the tank outlet 40 in the recess 50, after which a plurality of conventional fasteners 62, such as machine screws, washers and nuts, are assembled to the valve 42 and flange 60, as shown in FIG. 5.

Figure 6:
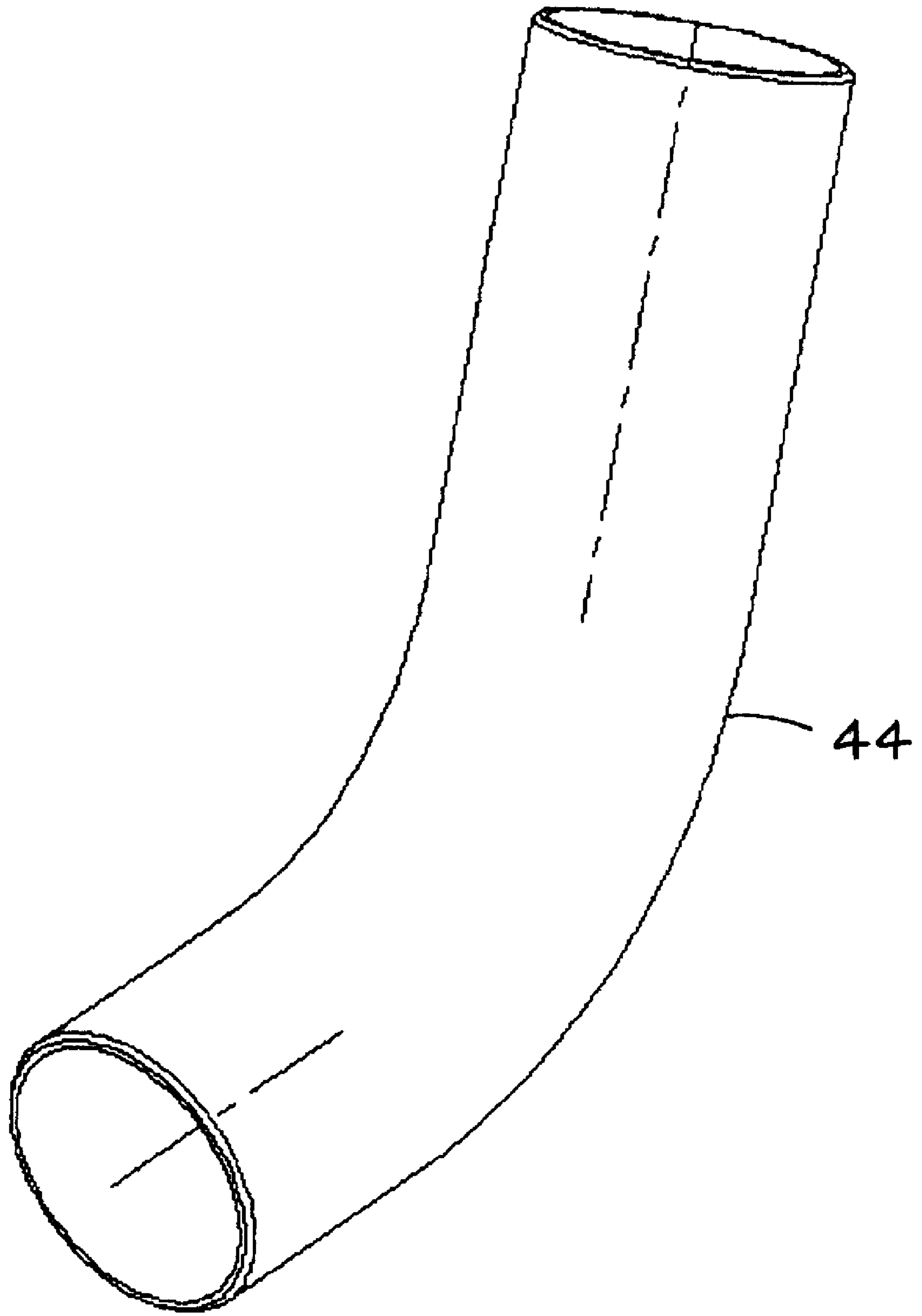
FIG. 6 is an enlarged perspective view of a pump inlet tube useful in the practice of the present invention.
Figure 8:
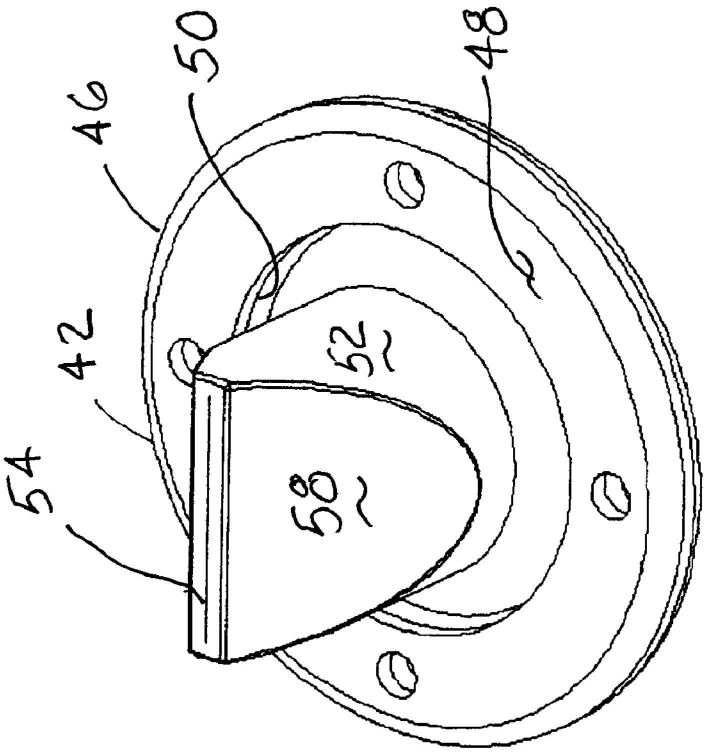
FIG. 8 is a perspective view of the valve of FIG. 7.
Figure 7:
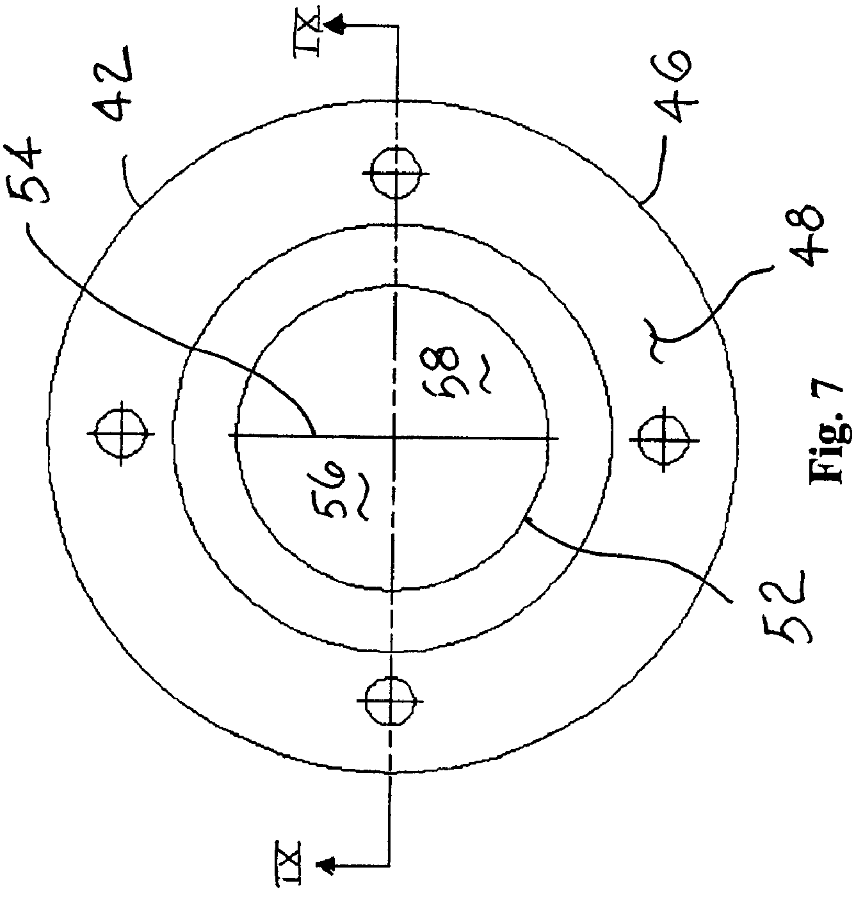
FIG. 7 is a top plan view of a self-closing valve useful in the practice of the present invention.
Figure 10:
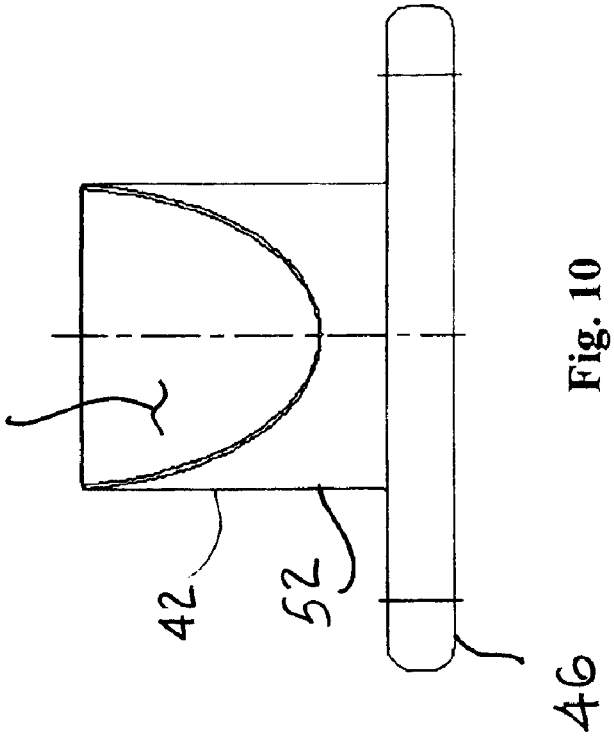
FIG. 10 is a side elevation view of the valve of FIG. 7.
Figure 9:
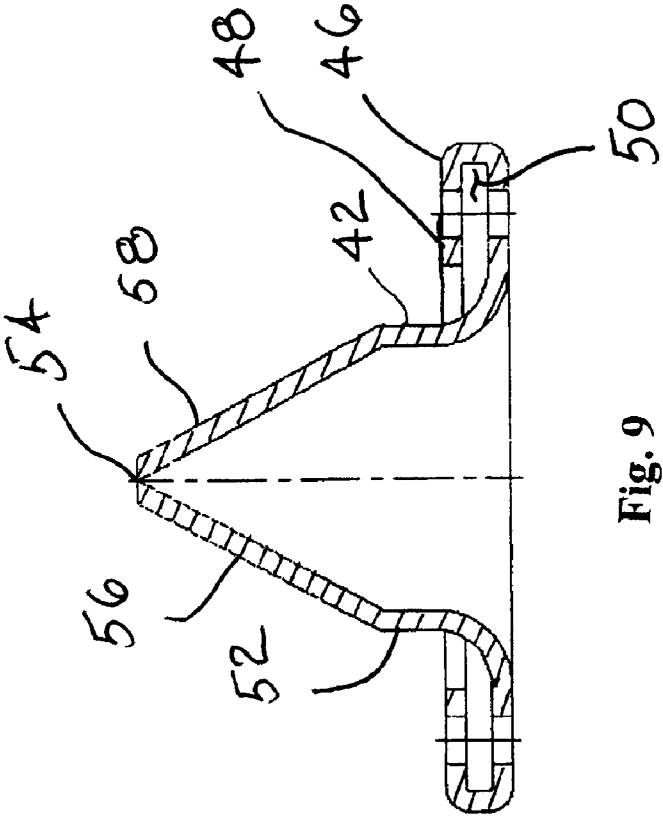
FIG. 9 is section view taken along line IX-IX of FIG. 7.
Figure 11:
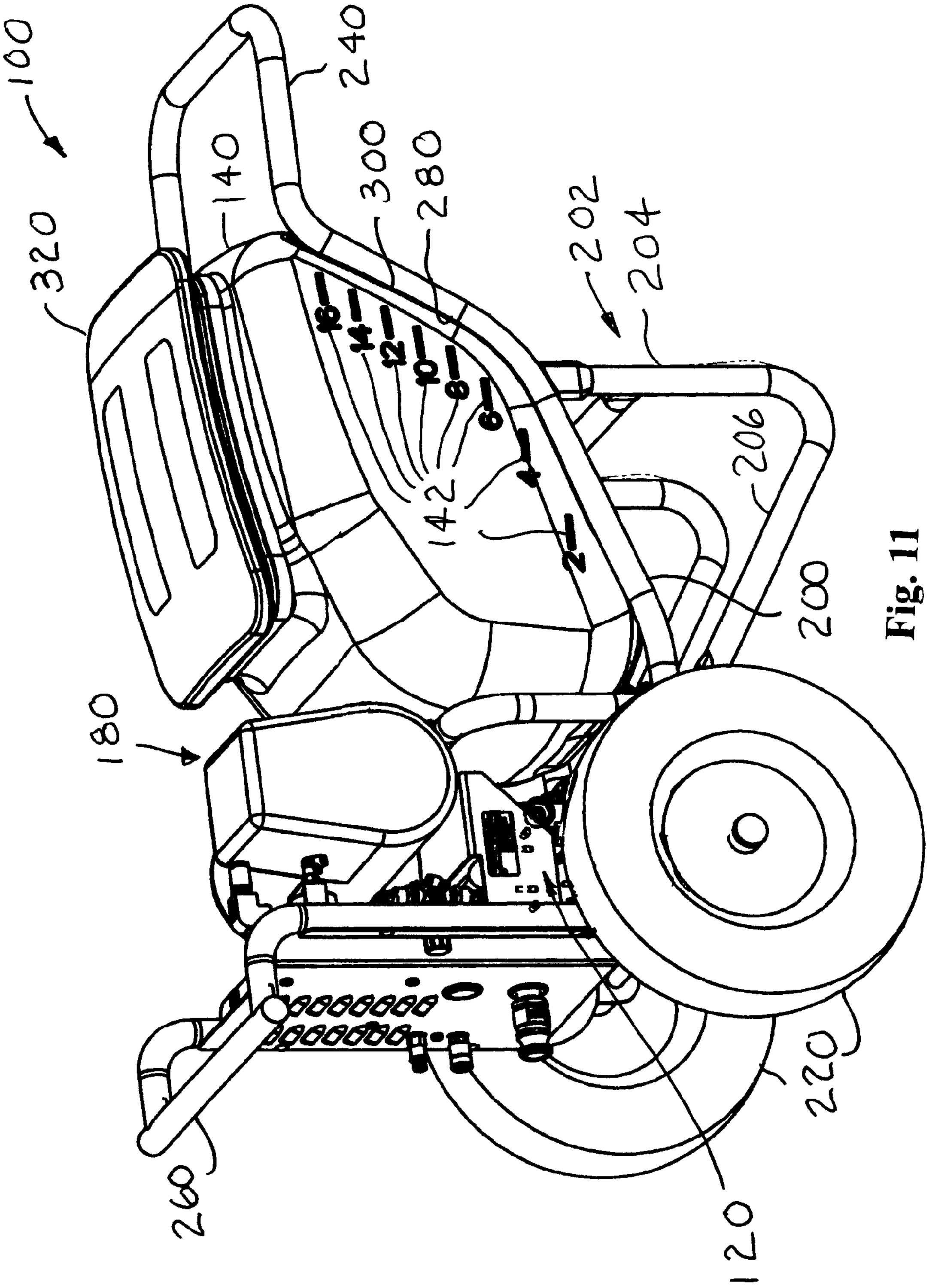
FIG. 11 is a perspective view of an alternative embodiment of the texture sprayer pump unit useful in the practice of the present invention.
Figure 12:
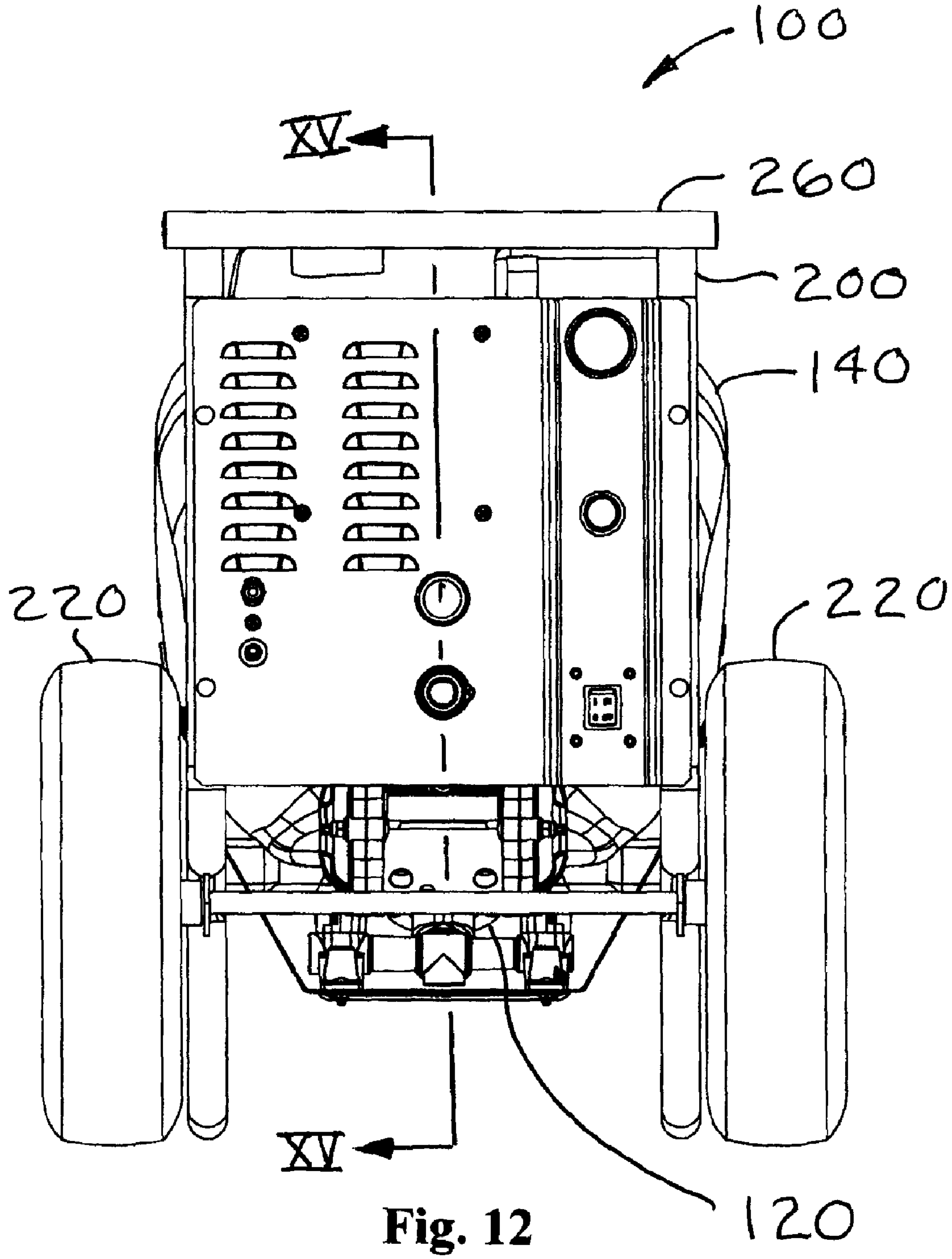
FIG. 12 is a front elevation view of the unit shown in FIG. 11.
Figure 13:
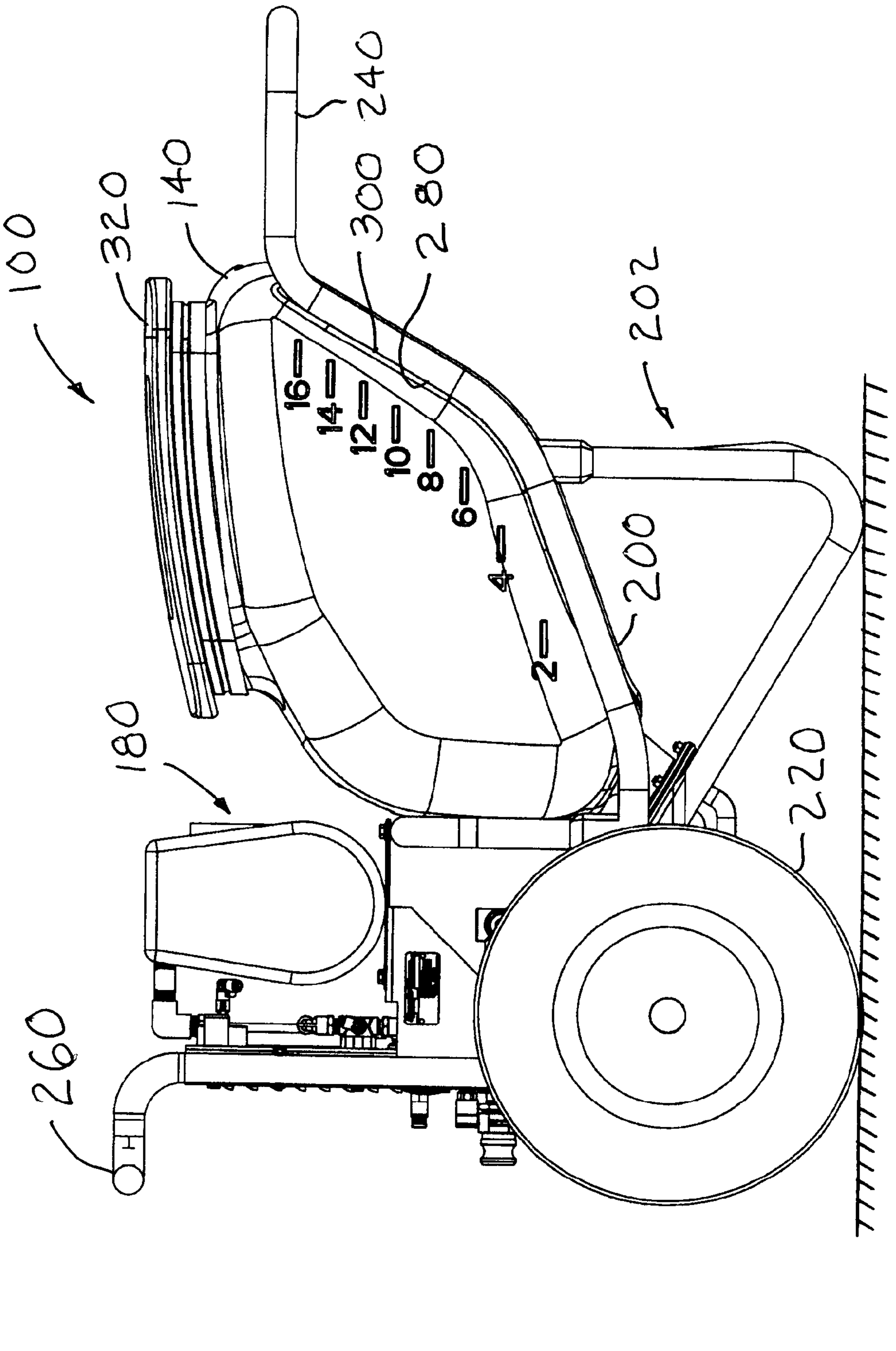
FIG. 13 is a side elevation view of the unit shown in FIG. 11, oriented to an operating position.

As shown in FIG. 6, the pump inlet tube 44 may be formed of stainless steel, and is sized to be received in the central portion 52 of valve 42 with sufficient length to open the slit 54 when the tank 14 is received on the frame 20.

In the operation of the texture spray unit 10, texture material is placed in the tank 14 through the opening in the top of the tank, and the cover 32 is placed on the tank, closing the opening. The unit 10 is started, causing the air source or compressor 18 to run, operating the pump 12 and providing compressed air and texture material (separately) to the texture spray gun 16. As the gun 16 is triggered, air and texture material is emitted from the gun 16 to apply the texture material to a surface to be coated. Pump 12 is preferably an air driven diaphragm type pump, capable of operating with a stalled output condition, which occurs when the gun trigger is released, stopping material emission from the gun 16.

It is to be understood that the pump 12 may be a conventional air driven diaphragm pump, as is available from Wagner Colora Srl in Italy, with contact information as follows:—via Fermi, 3—20040—Burago Molgora—MI—tel 39 039 62502.1—fax 39 039 6851800—info@wagnercolora.com. The compressor 18 may be a conventional 2 hp air compressor providing 8 CFM @ 45 psi, for the first embodiment, and 3 CFM @ 45 psi for the second embodiment.

Referring now to FIGS. 11-25, a third alternative embodiment 100 of the texture spray pump unit 10 may be seen. In this embodiment, the same or similar parts and portions are identified by the same reference numerals, except incremented by 100 from the reference numerals associated with the first and second embodiments described supra. Additional or different features have reference numerals in the incremented series without necessarily having corresponding reference numerals associated with the earlier embodiments.

Figure 14:
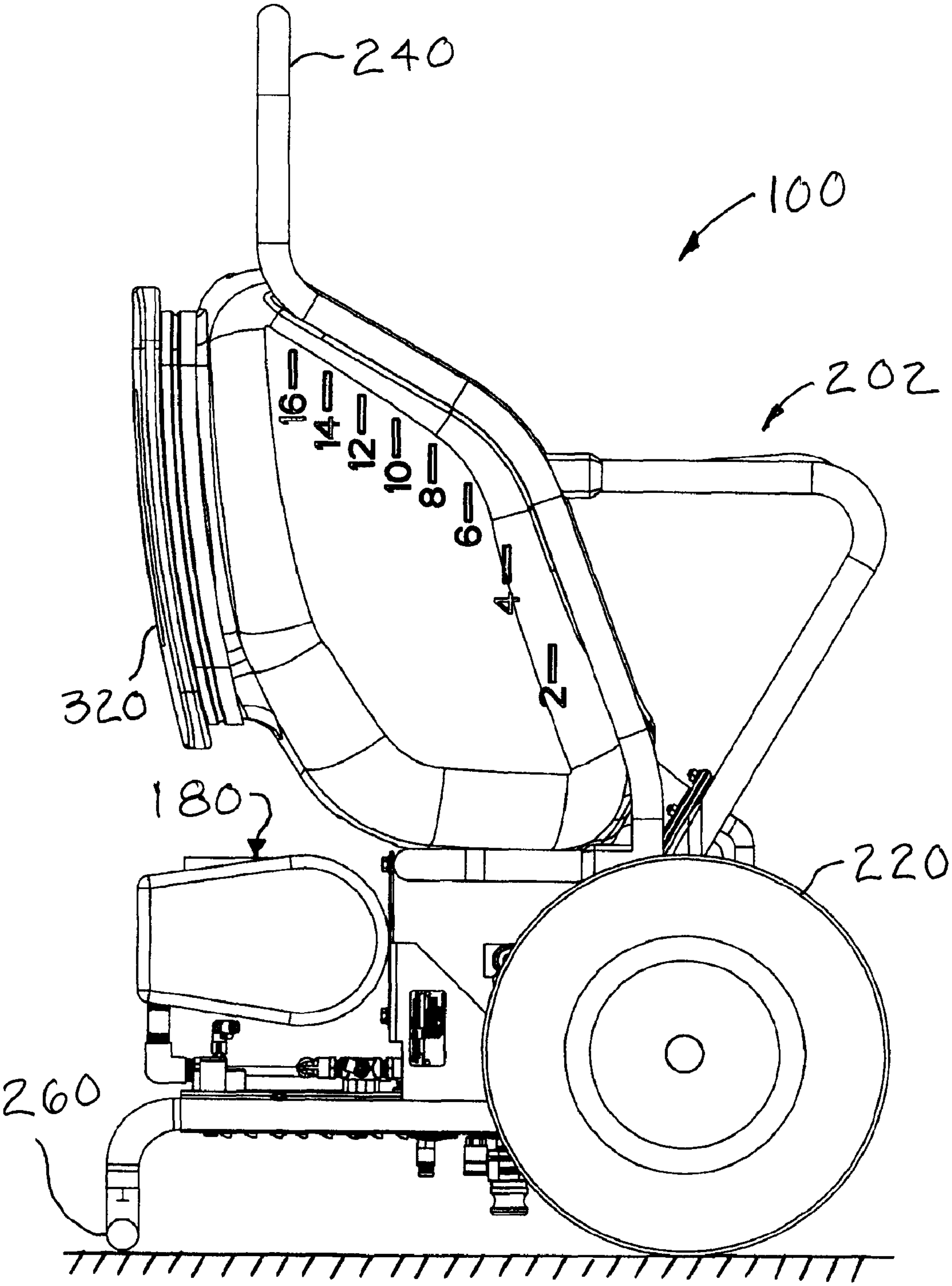
FIG. 14 is a side elevation view of the unit shown in FIG. 13, except rotated 90 degrees to a storage position.
Figure 15:
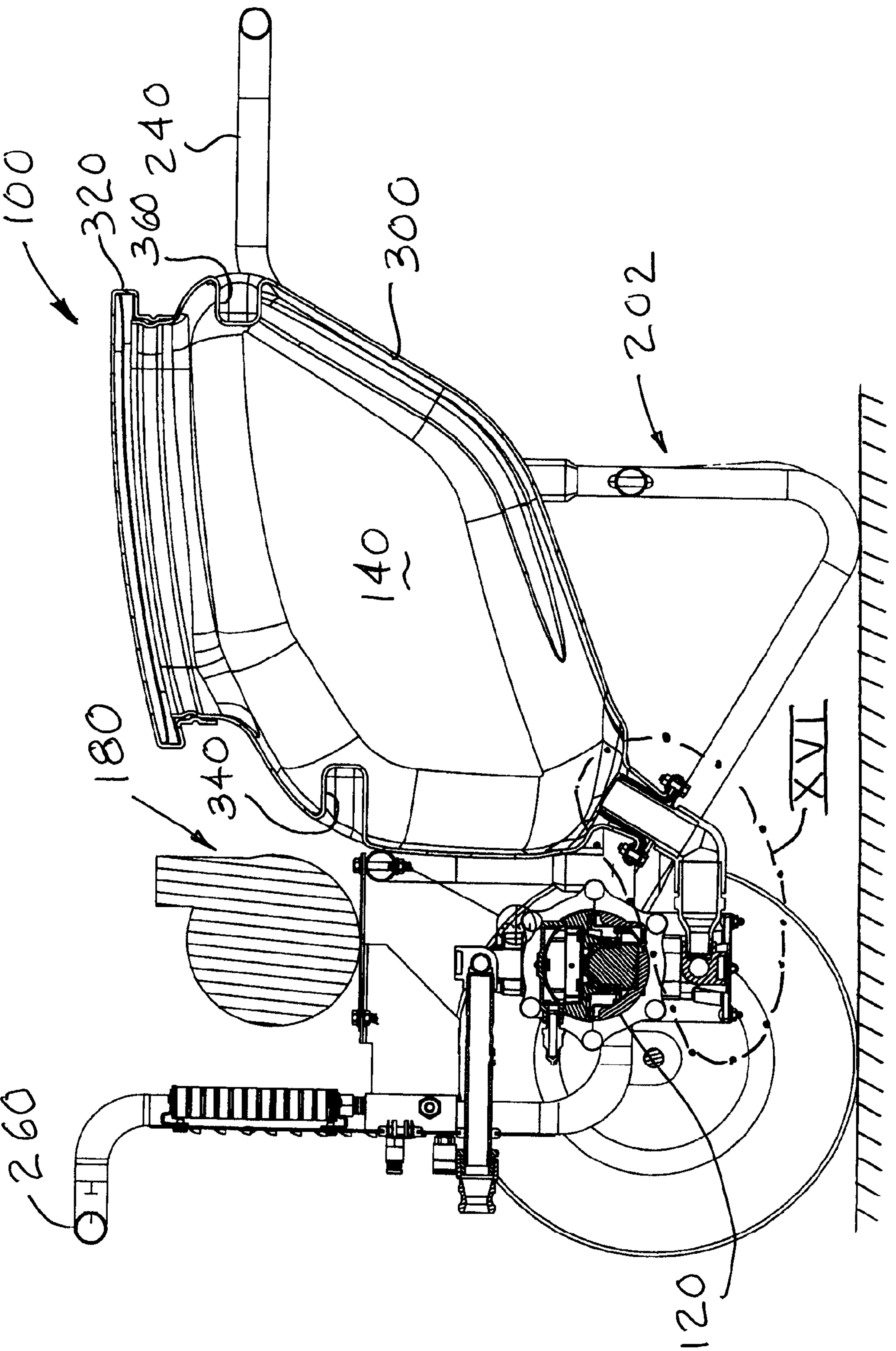
FIG. 15 is a side elevation section view of the unit shown in FIG. 13, taken along line XV-XV in FIG. 12.

In this embodiment, unit 100 has a pump 120, a tank 140, and an air source 180. Air source 180 may be a single head or piston air compressor. Tank 140 may have molded in graduations 142 to indicate the quantity of texture material remaining in tank 140. Unit 100 has a frame 200, a pair of wheels 220, and a primary handle 240, each similar to that of unit 10. However, secondary handle 260 differs from handle 26 in that the position of handle 260 is relocated, so that unit 100 can be tilted up by 90 degrees (as shown in FIG. 14) and stored in that position, with the unit 100 resting on wheels 220 and handle 260, now acting as a leg or support for unit 100. Additionally, unit 100 has a pair of legs 202, each of which have a vertical portion 204 and a sloping portion 206, to assist a user to more easily navigate stairs with the unit 100. Unit 100 also has lid 320 for tank 140 and a pair of mating portions 300 in tank 140 to mate with portions 280 in frame 200. Tank 140 has molded in handles 340 and 360, as shown in FIG. 15.

Figure 16:
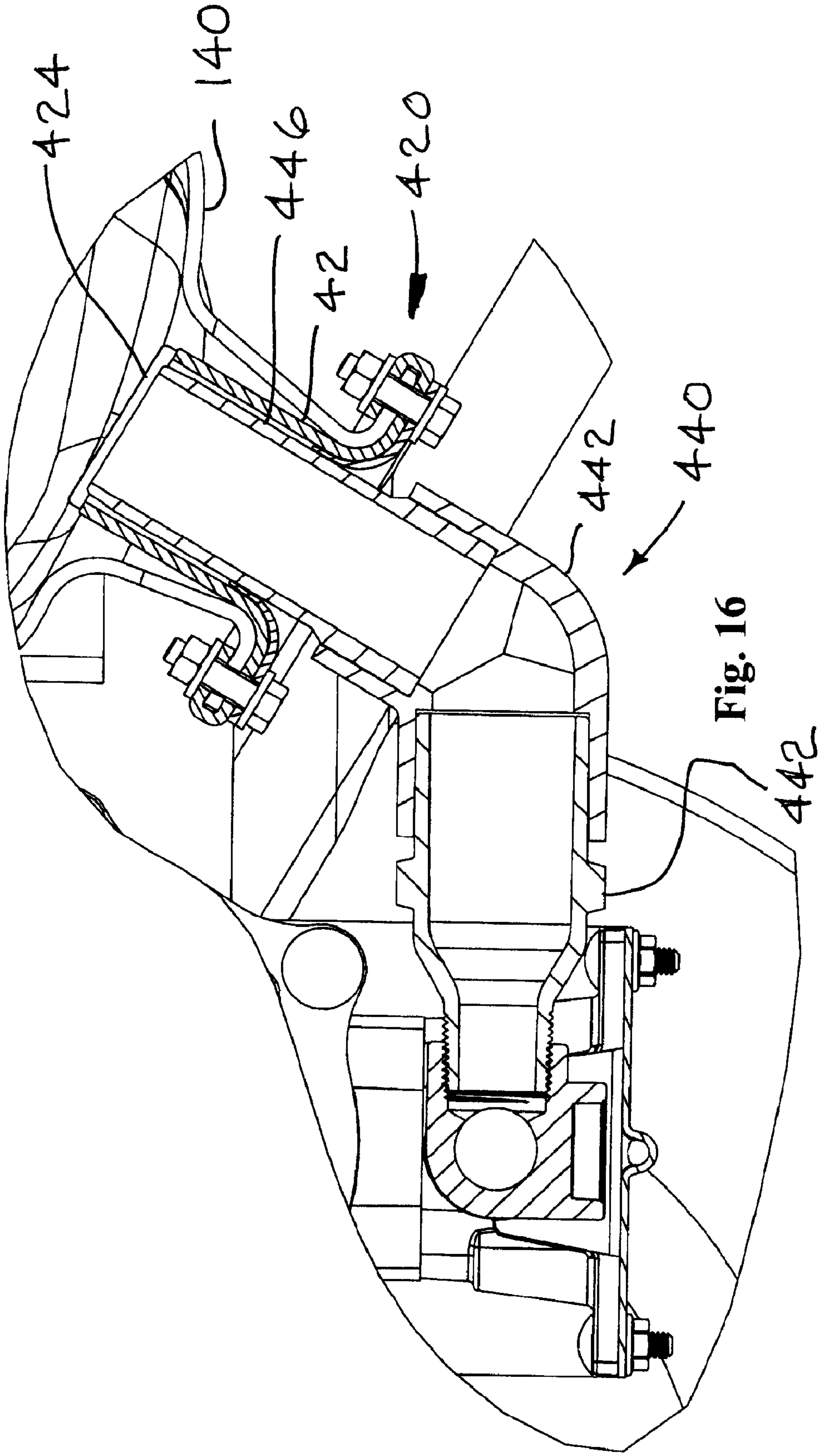
FIG. 16 is an enlarged view of a detail XVI of FIG. 15.
Figure 17:
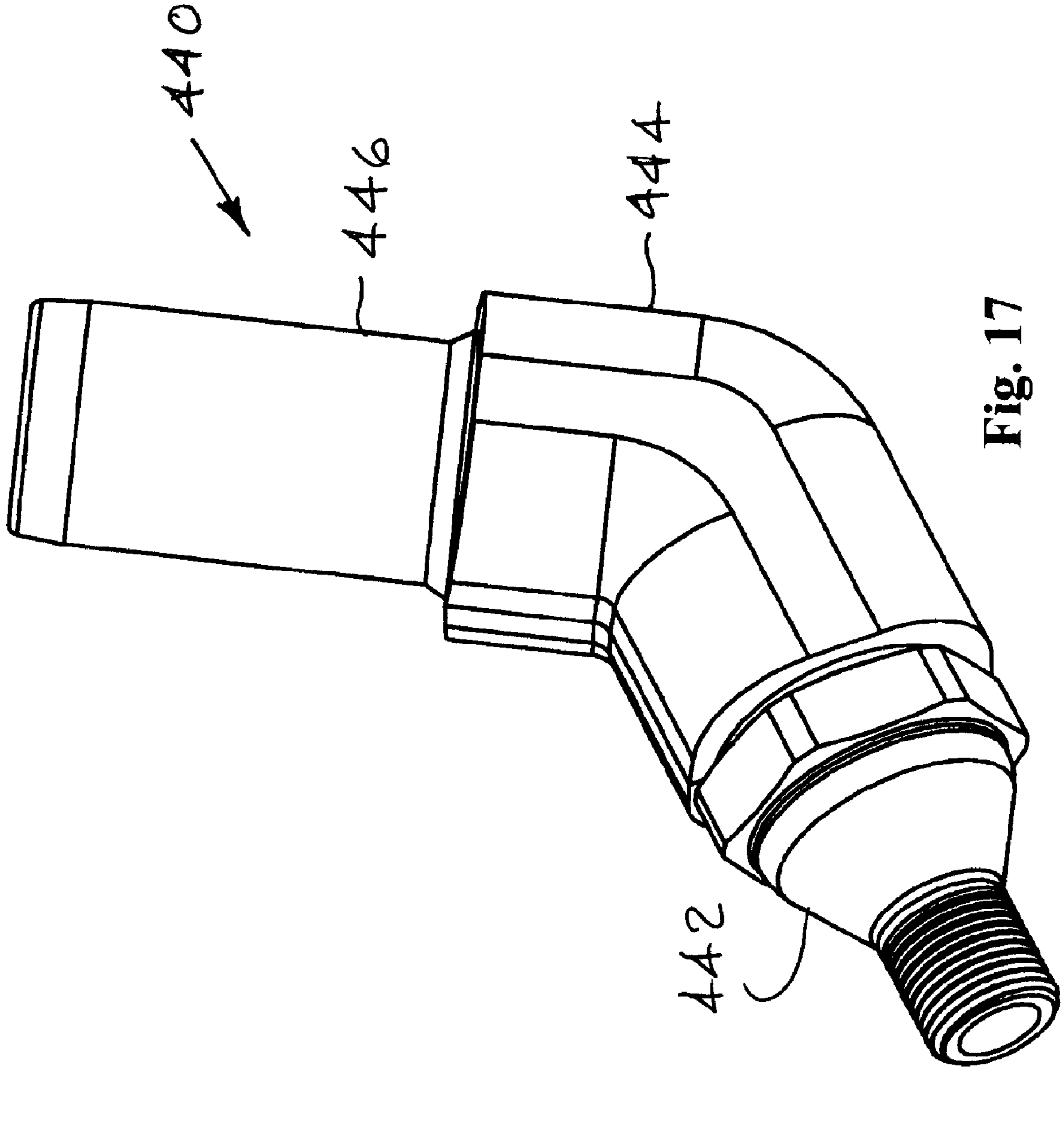
FIG. 17 is an enlarged perspective view of an alternative embodiment of the pump inlet tube useful in the practice of the present invention.

Referring now most particularly to FIGS. 16 and 17, an alternative embodiment 440 for the pump inlet tube 44 may be seen. In this embodiment, the pump inlet tube 440 is a three piece assembly formed of a polymer, such as an ABS plastic material. Tube 440 has a first section 442 in the form of a reducer sized to couple to an inlet of the pump 120, a second section 444 in the form of an angled elbow, and a third portion 446 in the form of right circular cylinder sized and positioned to engage the valve 420 when the tank 140 is received on the frame 200.

Figure 18:
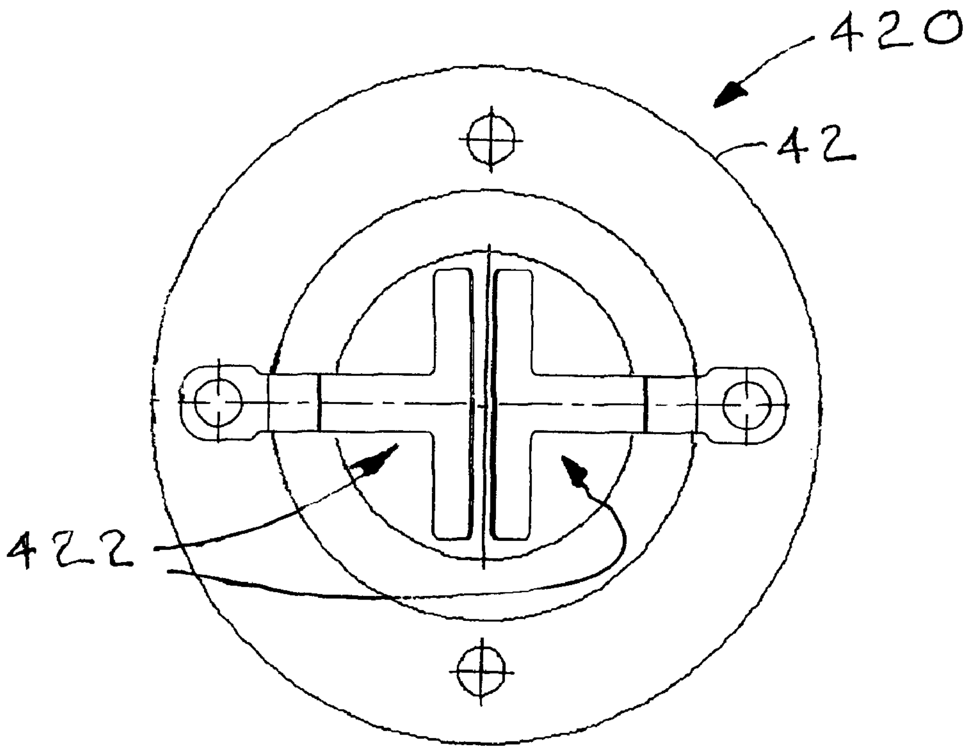
FIG. 18 is a plan view of an alternative valve assembly useful in the practice of the present invention.
Figure 19:
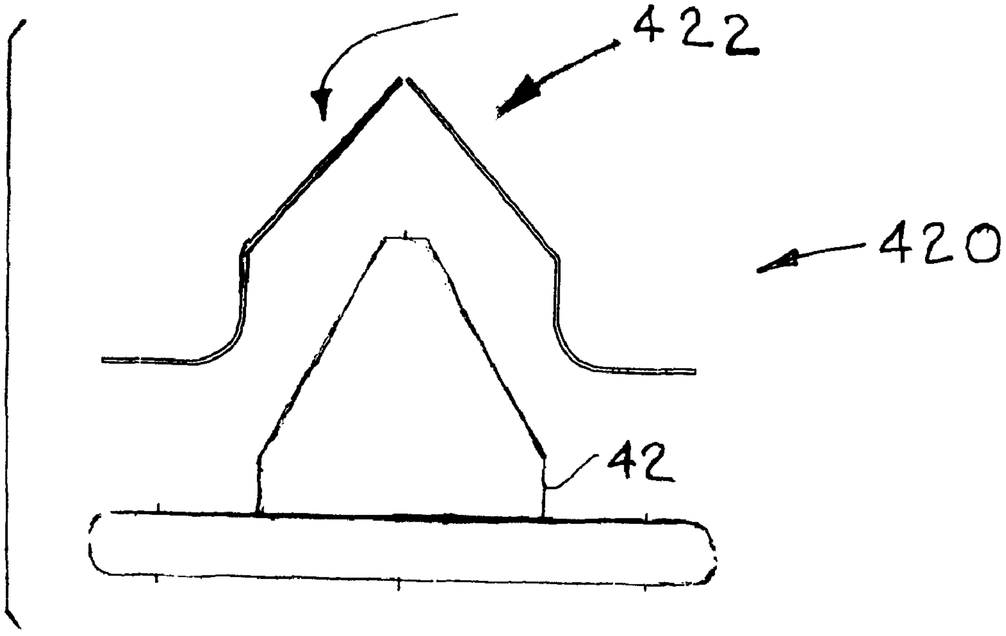
FIG. 19 is a first side elevation exploded view of the valve assembly of FIG. 18.
Figure 20:
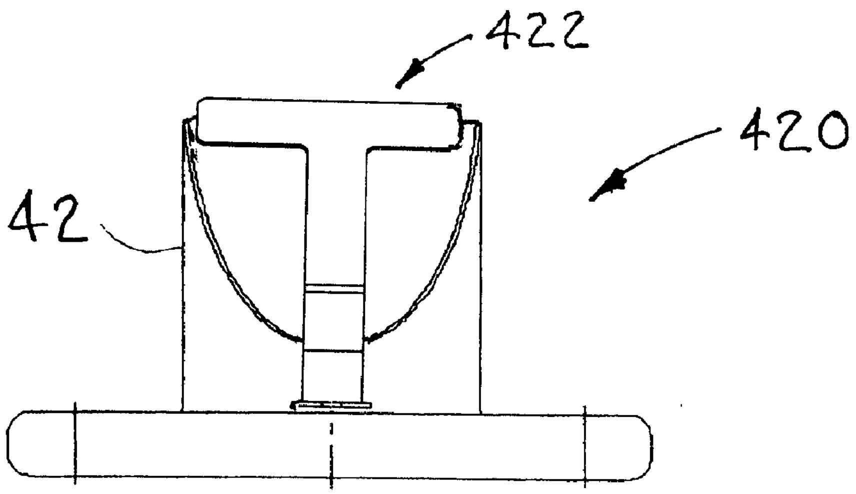
FIG. 20 is a second side elevation assembled view of the valve assembly of FIG. 18 rotated 90 degrees from that shown in FIG. 19.
Figure 21:
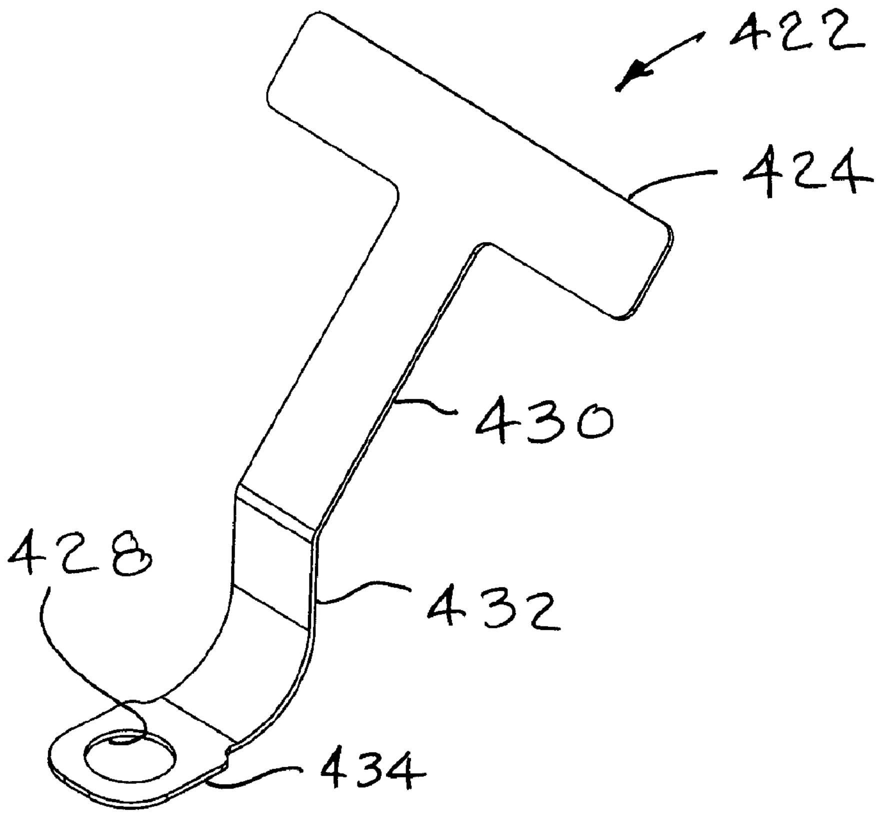
FIG. 21 is a perspective view of a helper spring useful in connection with the valve assembly of FIG. 18.
Figure 22:
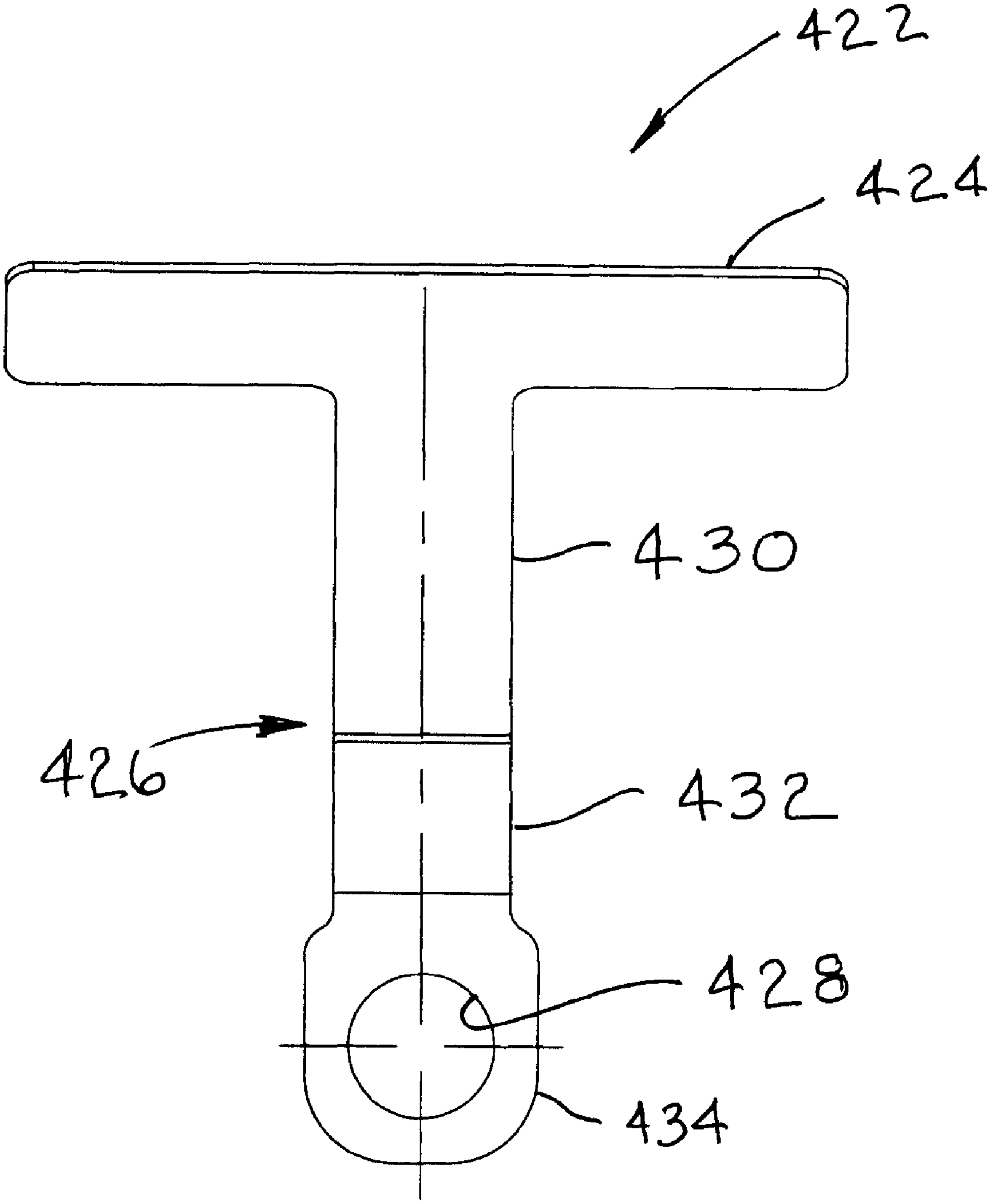
FIG. 22 is a first plan view of the spring of FIG. 21.
Figure 25:
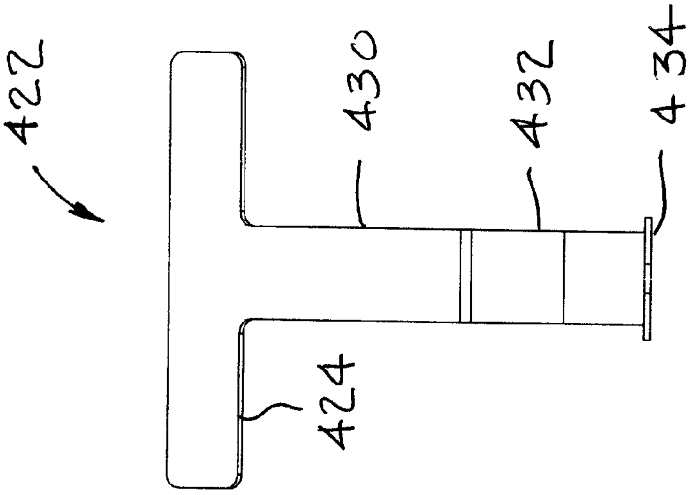
FIG. 25 is a third plan view of spring of FIG. 21.
Figure 24:
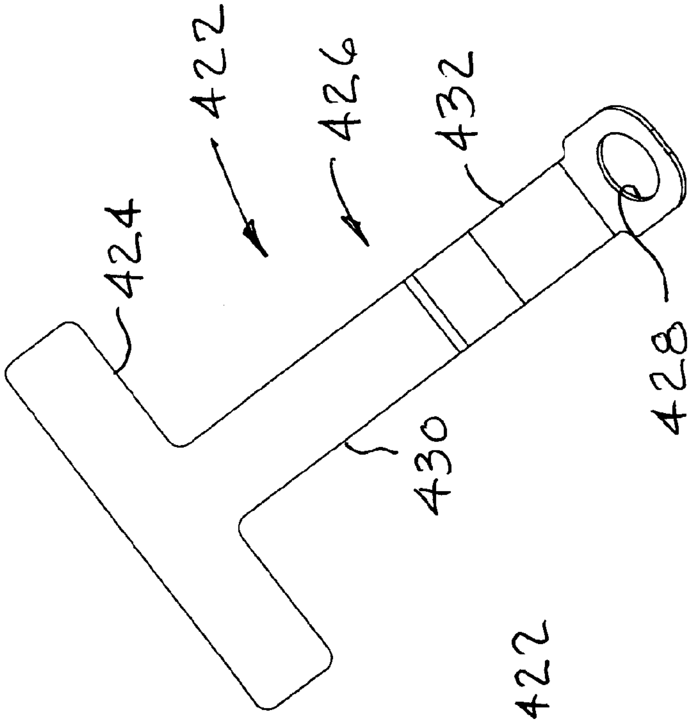
FIG. 24 is a second plan elevation view of the spring of FIG. 21.
Figure 23:
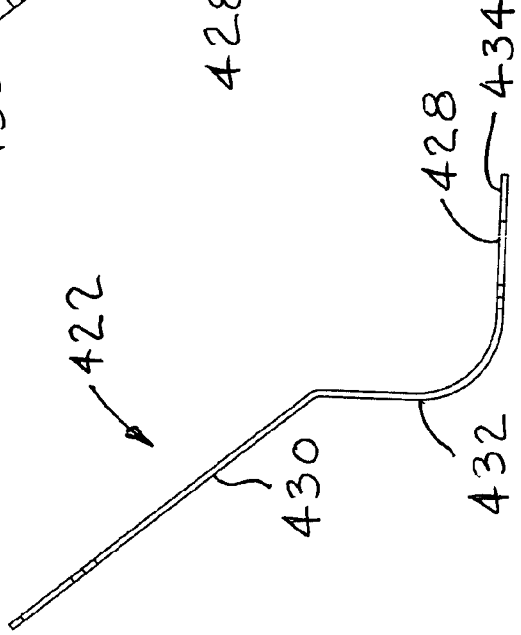
FIG. 23 is a side elevation view of the spring of FIG. 21.

Referring now to FIGS. 18-25, a valve assembly 420 includes a duckbill check valve 42 the same or similar to that for the previous embodiments. Valve 420 also preferably includes a pair of helper springs 422. Each helper spring 422 preferably has a generally T-shaped three dimensional configuration, with a crossbar 424 perpendicular to an ascender 426 having a mounting aperture 428 therein. The ascender 426 has a straight section 430 in plane with the crossbar 424 and a corner section 432 joining the straight section 430 with a mounting region 434 having the aperture 428 therein. FIG. 18 shows a plan view, FIG. 19 shows a side exploded view and FIG. 20 shows a side elevation view of the valve assembly 420 including the duckbill valve 42 and pair of helper springs 422. FIGS. 21 and 23 illustrate that the crossbar 424 and straight section 430 are in a common plane. FIG. 22 is a view of the spring 422, looking perpendicular to the mounting region 434. FIG. 24 is a view of the spring 422, looking perpendicular to the plane of the crossbar 424 and straight section 430. FIG. 25 is a view of the spring 422 looking parallel to the mounting region 434.

In operation, the cross bars of the springs 422 hold the slit aperture 54 in duckbill valve 42 closed in the absence of the pump inlet tube 440. This eliminates leakage that might otherwise occur due to any "memory" (i.e., partially inelastic behavior) of the slit aperture 54 remaining partially open after the tube 440 is withdrawn.

It may be noted that the angle of the planar straight section 430 and crossbar 424 is more acute than the angle of the angled faces 56 and 58 of the duckbill valve 42. This difference provides for a biasing force by the helper springs 422 acting against the duckbill valve 42 once the springs 422 are assembled to the valve 42 with the valve assembly 422 in the closed position as shown in FIGS. 18 and 20. It is to be understood, however, that the springs 422 are sufficiently resilient to allow the tube 440 to readily open the valve assembly 420 as shown in FIG. 16.

Although a duckbill type check valve is shown in the embodiments described herein, it is to be understood that other types of check valves may be used as alternatives, while still remaining within the scope of the present invention. For example, and not by way of limitation, flapper valves or reed valves may be substituted for the duckbill valve, if desired.

The invention is not to be taken as limited to all of the details thereof as modifications and variations thereof may be made without departing from the spirit or scope of the invention.

The invention claimed is:

1. A texture spray pump assembly comprising:

a frame;

a texture material pump on the frame;

a pump inlet operably connected to the texture material pump;

a texture material tank having at least one relatively longer side and at least one relatively shorter side, the tank manually separable from the frame; and a tank outlet operably connected to the texture material tank, the tank outlet including a valve that opens to place the pump inlet in fluid communication with the tank when the texture material tank is placed on the frame and closes when the texture material tank is removed from the frame;

wherein the frame is configured to support the assembly in to a first position in which the tank is positioned in an upright condition with the at least one relatively longer side oriented generally horizontally for holding texture material during spraying operation and the frame is configured to support the assembly in a second position in which the tank is positioned for storage with the at least one relatively longer side oriented generally vertically.

2. The texture spray pump assembly of claim 1 wherein the valve comprises a duckbill valve having a slit aperture.

3. The texture spray pump assembly of claim 2 wherein the valve further comprises at least one helper spring urging the slit aperture closed.

4. The texture spray pump assembly of claim 3 wherein the at least one helper spring comprises a pair of helper springs.

5. The texture spray pump assembly of claim 4 wherein each of the pair of helper springs has a generally T-shaped three dimensional configuration with a crossbar perpendicular to an ascender having a mounting aperture, wherein the crossbar is in contact with the valve adjacent a slit aperture of the duckbill valve and urges the valve to the closed condition.

6. The texture spray pump assembly of claim 3 wherein the at least one helper spring comprises a crossbar located adjacent the slit aperture.

7. The texture spray pump assembly of claim 1 wherein the pump inlet includes a passageway with a cross section sufficiently large enough to permit the flow of a slurry type texture material therethrough.

8. The texture spray pump assembly of claim 1 wherein the frame includes frame mating portions and the tank includes tank mating portions, the frame mating portions receiving and guiding the tank via the tank mating portions to align the tank outlet with an inlet of the texture material pump as the tank is received on the frame.

9. The texture spray pump assembly of claim 1 wherein the valve opens when the pump inlet interacts with the tank outlet and closes when the pump inlet is withdrawn from the tank outlet.

10. The texture spray pump assembly of claim 9 wherein the pump inlet is configured to penetrate the valve when the pump inlet interacts with the tank outlet, thereby permitting texture material to flow from the texture material tank to the texture material pump.

11. The texture spray pump assembly of claim 1 wherein the texture material tank includes a removable tank cover so that the texture material tank can be refilled.

* * * * *